United States Patent [19]

Hamm

[11] 4,452,657
[45] Jun. 5, 1984

[54] COMPOSITE INTEGRAL WEB STIFFENING METHOD

[75] Inventor: Robert A. Hamm, Bellevue, Wash.
[73] Assignee: The Boeing Company, Seattle, Wash.
[21] Appl. No.: 432,886
[22] PCT Filed: Sep. 15, 1982
[86] PCT No.: PCT/US82/01248
   § 371 Date: Sep. 15, 1982
   § 102(e) Date: Sep. 15, 1982
[87] PCT Pub. No.: WO84/01128
   PCT Pub. Date: Mar. 29, 1984
[51] Int. Cl.³ .................................... B29C 17/04
[52] U.S. Cl. ............................ 156/198; 52/309.16;
   52/630; 156/213; 156/215; 156/227; 156/265;
   156/297; 156/307.7; 156/330; 244/119;
   428/120
[58] Field of Search ............... 156/198, 213, 215, 265,
   156/297, 307.7, 300, 301, 227, 330; 428/120,
   119; 244/119; 52/630, 309.16, DIG. 52

[56] References Cited

U.S. PATENT DOCUMENTS

| | | | |
|---|---|---|---|
| 2,545,704 | 3/1951 | Raffel | 156/300 |
| 2,715,596 | 8/1955 | Hawley | 156/297 |
| 2,739,920 | 3/1956 | Martin | 156/300 |
| 2,791,463 | 5/1957 | Levitt | 52/DIG. 7 |
| 2,833,682 | 5/1958 | De Lazslo | 156/297 |
| 3,029,910 | 4/1962 | Kirk et al. | 156/300 |
| 3,503,833 | 3/1970 | Carlson | 156/265 |
| 3,544,417 | 12/1970 | Corzine | 156/300 |
| 3,771,748 | 11/1973 | Jones | 244/119 |
| 3,791,688 | 7/1976 | Abbott | 156/297 |
| 3,932,249 | 1/1976 | Jury et al. | 156/213 |
| 3,965,942 | 6/1976 | Hatch | 428/120 |
| 4,113,910 | 9/1978 | Loyd | 428/119 |
| 4,169,749 | 10/1979 | Clark . | |
| 4,177,306 | 12/1979 | Schulz et al. | 428/120 |
| 4,198,018 | 4/1980 | Brault | 244/119 |
| 4,223,053 | 9/1980 | Brogan . | |
| 4,292,368 | 9/1981 | Mialon | 156/198 |
| 4,331,723 | 5/1982 | Hamm | 52/309.16 |

FOREIGN PATENT DOCUMENTS

| | | | |
|---|---|---|---|
| 1271198 | 7/1961 | France . | |
| 1395 | 7/1980 | World Intel. Prop. Org. | 244/119 |
| 2718 | 10/1981 | World Intel. Prop. Org. | 244/119 |

Primary Examiner—Jerome W. Massie
Attorney, Agent, or Firm—Nicolaas DeVogel; Bernard A. Donahue

[57] ABSTRACT

"I" beam or web structures of laminated composite material or sheets are being stiffened by transverse webs stiffeners having a tubular configuration with flattened end portions. The flattened end is inserted between the laminated web material or sheets and cured therewith to form an integral stiffened web structure.

1 Claim, 13 Drawing Figures

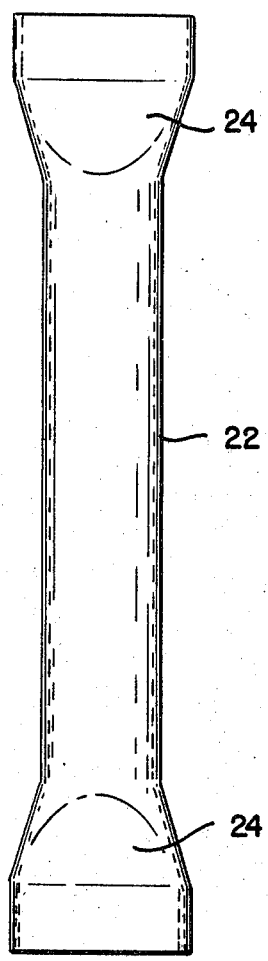
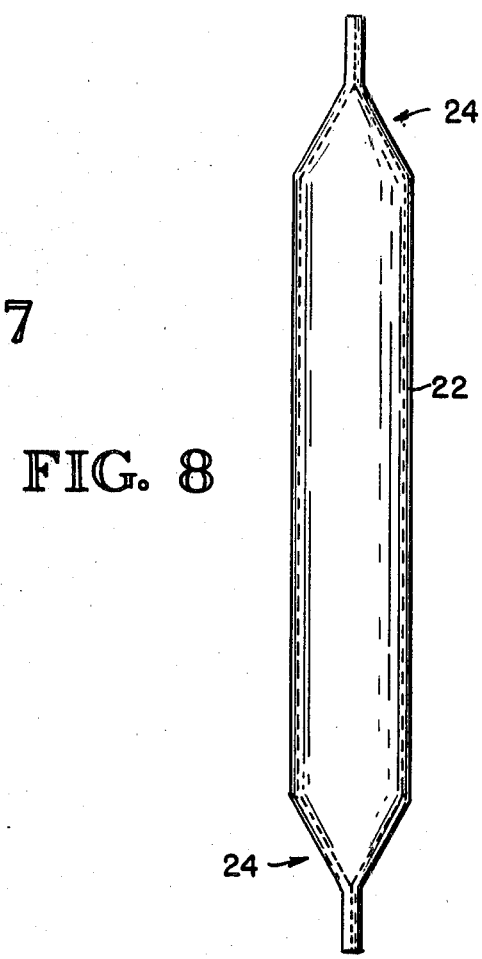
FIG. 7      FIG. 8
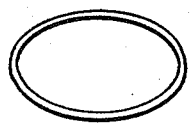 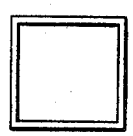 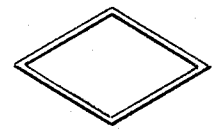
FIG. 9A      FIG. 9B      FIG. 9C
FIG. 9D      FIG. 9E
 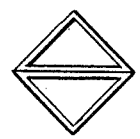

COMPOSITE INTEGRAL WEB STIFFENING METHOD

BACKGROUND OF THE INVENTION

This invention relates to stiffening a composite material web structure with transverse stiffeners. In the conventional, aluminum-metal design approach, a standard angle stiffener is utilized which is riveted against the web. However, fastening methods utilizing rivets cannot be used in graphite epoxy parts because the expansion of the head may crack the resin. Furthermore, fasteners should be electro-chemically compatible to prevent corrosion. The solution of utilizing screw type fasteners becomes highly uneconomical and utilizing so-called stiffeners becomes complicated in design, tooling and manufacture. By the teachings of this invention, transverse web stiffeners are utilized in the form of tubular elements having flattened ends which are inserted between the composite laminations of the web material.

The following references were found to be of interest: U.S. Pat. Nos. 3,831,333; 3,995,080; 4,047,354; 4,113,910; 4,129,974; 4,198,018; 4,219,980; and 4,219,980; Italian Pat. No. 682,106 and British Pat. No. 640,341.

A close approach to the present inventive method and proposed construction was not observed and accordingly, the patents should be considered as being of general interest and illustrating the scope of the available art. Several of these patents disclose various types of transverse stiffeners or reinforcements for beam structures of the general type under consideration, however, none appear to be close structurally to the proposed concept.

SUMMARY OF THE INVENTION

In general, stiffening of web construction or structures is often demanded in aircraft manufacture, such as rear spar assemblies, on horizontal and/or vertical stabilizers and in vertical wing or rib structures due to requirements for system attachments, access holes, etc.

The present invention proposes a web stiffening method wherein a tube with flattened ends is inserted between the composite epoxy laminates or between two graphite epoxy sheets. The tube, which may be of any metal or composite material, is cured into place by the curing of the web about the inserted tube. As a result, the tube and cured webs become an integral part of the stiffener.

BRIEF DESCRIPTION OF THE DRAWINGS

FIG. 7 is a thin wall tube in forward view.

FIG. 8 is a thin wall tube in side view.

FIGS. 9A–9E are cross sections of various possible tube configurations.

DETAILED DESCRIPTION OF THE INVENTION

Figure 1:
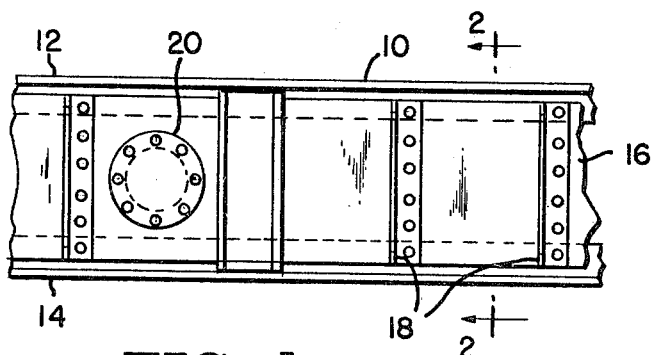
FIG. 1 illustrates a typical conventional aircraft web structure.
Figure 2:
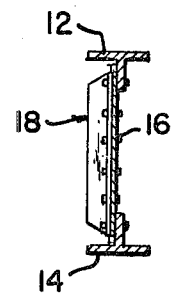
FIG. 2 is a cross section taken along line 2—2 of FIG. 1.
Figure 3:
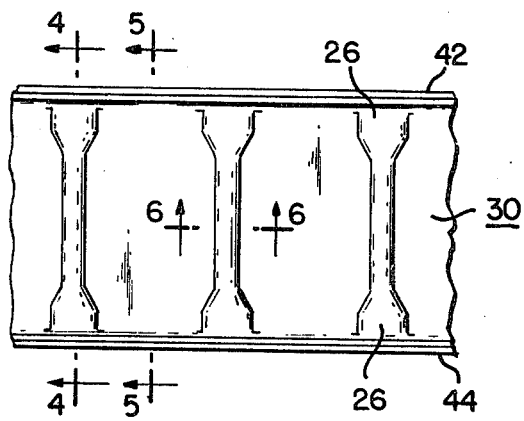
FIG. 3 illustrates a graphite epoxy web structure stiffened by the present inventive method.
Figure 6:
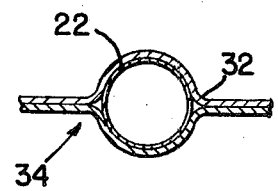
FIG. 6 is a cross section taken along line 6—6 of FIG. 3.
Figure 4:
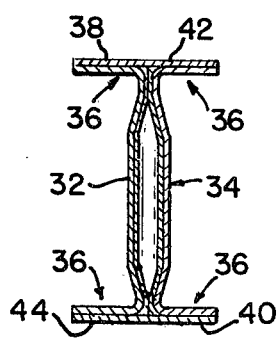
FIG. 4 is a section taken along line 4—4 of FIG. 3.
Figure 5:
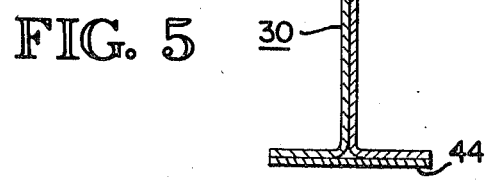
FIG. 5 is a cross section taken along line 5—5 of FIG. 3.

In the conventional aluminum aircraft structure 10, illustrated in FIGS. 1 and 2, there are spars or ribs 12 and 14 interconnected by a web 16 which together form a typical structural assembly. In the event the web portion has to be strengthened, stiffeners 18 or doublers 20 are riveted against the web and are normally attached to the spars 12 and 14 as well. Now, as mentioned herein, when utilizing composite materials, it becomes difficult to attach stiffeners by the conventional method and also uneconomical and inefficient. Accordingly, the present invention utilizes a stiffener 22 which, in the preferred embodiment, has the shape of a tube made of thin wall tubing of corrosion resisting steel or titanium or other suitable material. The tube stiffener 22 is cut long enough to carry a load from spar to spar. Referring to FIGS. 7 and 8, the tube or stiffener 22 has been flattened at both ends 24 so as to accomplish easy insertion between laminations or webs and to accomplish a strong junction or interconnection at the upper and lower spar assembly 26. The complete assembly of a stiffened composite web structure 30 is illustrated in FIGS. 3–6 and cross sections 4—4, 5—5 and 6—6. In this preferred embodiment, a double or laminated web 32 and 34 are utilized which are flanged at their general end portions 36 so as to form an integral "T" spar 38 and 40 together with the cap strips 42 and 44, respectively. Of course, any variation of assembly can be utilized, i.e. instead of making the integral "T" spars 42 and 44, separate "T" or "L" sections may be bonded or fused to the webs 32 and 34. Furthermore, instead of curing the web 32 and 34 at each tube 22 circumference which creates a centered integral stiffener arrangement, it will be possible to cure the webs at varied positions of the tube circumference so that the tube 22 may be off-centered. Furthermore, tube type stiffeners form a highly efficient structure due to:

(1) symmetry,
(2) double shear tube to web attachment and
(3) closed section tube ends, which avoids free angle edge and provides low crippling value as compared to conventional angle stiffeners 18 and which may be replaced with other types of stiffener tube configurations providing other advantages of strength or constructural interconnections. For example, several cross sectional tube arrangements may be utilized as illustrated in FIGS. 9A–9E.

Having thus described the present invention which by its novel method produces a novel structural arrangement, the following is therefore claimed:

I claim:

1. A method of manufacturing and stiffening graphite epoxy web structures into a load-carrying beam support structure for aeronautical vehicles having at least one hat section and a web structure comprising the steps of:
   a. providing a web structure consisting of two adjacent web sheets of composite material;
   b. forming at least one hat section;
   c. cutting a tube substantially as long as the portion of the web to be stiffened;
   d. flattening at least one end of the tube;
   e. inserting the flattened end of the tube between the web sheets towards and against the hat section; and
   f. curing the hat section with a cap strip of composite material and the two adjacent web sheets substantially equally about the inserted tube circumference so that the tube and the cured about web sheets become a stiffened structural web and together with the hat section forms a load-carrying beam.

* * * * *